March 27, 1962 H. E. ENGLESON ET AL Re. 25,143
LIFE SAVER PACKAGE
Original Filed Oct. 18, 1956 2 Sheets-Sheet 1
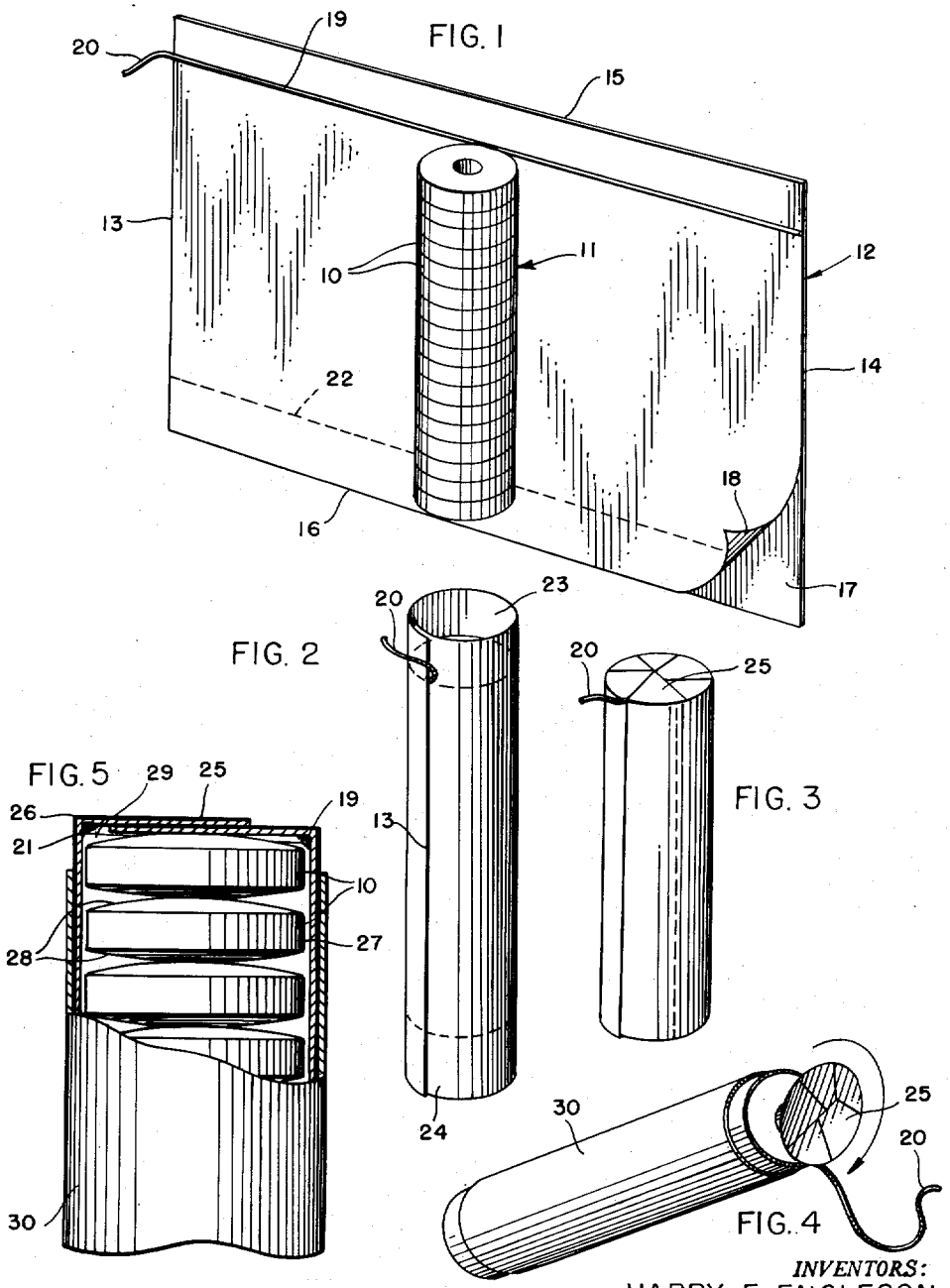
INVENTORS:
HARRY E. ENGLESON
ELMER D. SRAMEK
BY
Marzall, Johnston, Cook & Root
ATT'YS

LIFE SAVER PACKAGE

Original Filed Oct. 18, 1956 2 Sheets-Sheet 2

INVENTORS:
HARRY E. ENGLESON
ELMER D. SRAMEK
BY
Margall, Johnston, Cook & Root
ATT'YS United States Patent Office Re. 25,143
Reissued Mar. 27, 1962

25,143

LIFE SAVER PACKAGE

Harry E. Engleson, Morton Grove, and Elmer D. Sramek, Cicero, Ill., assignors, by mesne assignments, to Crompton & Knowles Packaging Corporation, Holyoke, Mass., a corporation of Massachusetts Original No. 2,926,833, dated Mar. 1, 1960, Ser. No. 616,823, Oct. 18, 1956. Application for reissue Aug. 25, 1961, Ser. No. 134,054
4 Claims. (Cl. 229—51)

Matter enclosed in heavy brackets [ ] appears in the original patent but forms no part of this reissue specification; matter printed in italics indicates the additions made by reissue.

This invention relates to an improved package and method of making same, and more particularly to a package having novel means for opening one end and permitting access thereto.

The present invention is primarily useful in wrapping stacks of tablets or candies which are generally circular in shape, although other uses and purposes will be apparent to one skilled in the art. By way of specific example, a stack of hardened candies, each being annular in shape, are positioned in end to end relationship and wrapped with a sheet of laminated material, and with the opposite ends being folded against the opposite ends of the stack. A flexible opening member in the form of a strand or thread is secured along the inner face of the wrapping material and at one end thereto near a folded end portion. One end of the strand or thread is arranged to protrude from the package so that it may be pulled wherein the corresponding end portion will be torn loose thereby opening the package at one end.

Accordingly, it is an object of this invention to provide a novel package and method of making same.

Another object of this invention is in the provision of a novel package and method of making same which carries a flexible opening means for opening the package and providing access thereto.

Still another object of this invention resides in the provision of a novel package having means for opening same, wherein said means adds little cost and weight to the package while permitting the package to be opened more easily and quickly.

A further object of this invention is to provide a package having an opening element of thread for opening same which is secured to the inner face of the wrapper to assure tearing of the wrapper during pulling of the thread for opening the package.

A still further object of this invention is in the provision of a package having a flexible opening thread secured to its inner face and located at one end for removing a folded end portion by creating a line of tear around the package.

Another object of this invention is to provide a package including a group of articles that are peripherally wrapped with a sheet of laminated material which carries an opening thread along the inner face of the inner ply and which has a free end protruding from the package, whereby pulling of the free end of the thread effects the tearing operation with respect to the wrapper so that the package may be opened and the articles therein easily removed.

Other objects, features, and advantages of the invention will be apparent from the following detailed disclosure, taken in conjunction with the accompanying sheets of drawings, wherein like reference numerals refer to like parts, in which:

FIG. 1 is a perspective view of a stack of articles in position with respect to a sheet of wrapping material, illustrating the first step in forming the package according to the invention;

FIGS. 2 and 3 are perspective views illustrating subsequent steps in the formation of the package according to the invention;

FIG. 4 is a perspective view illustrating the step of opening the completed package with the opening element in accordance with the invention;

FIG. 5 is an enlarged fragmentary view of the package, with a portion broken away to show underlying and other parts in section;

Figure 6:
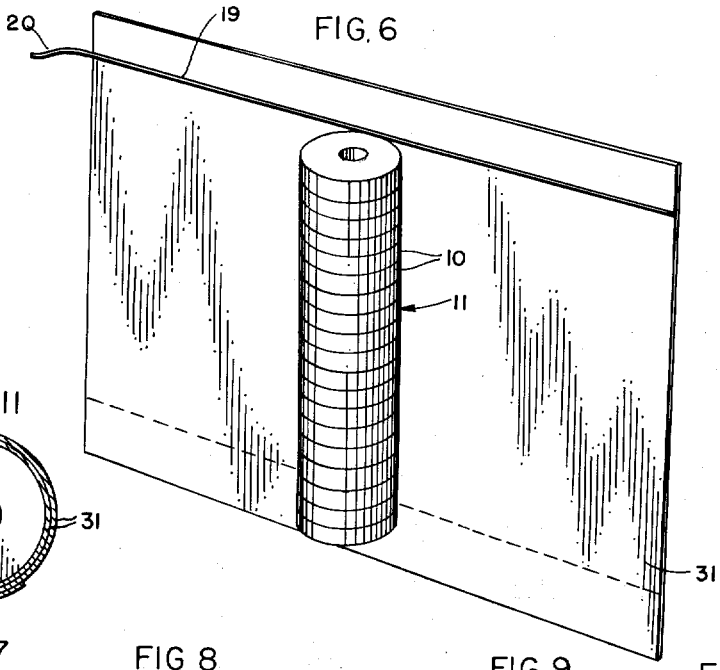
Figure 11:
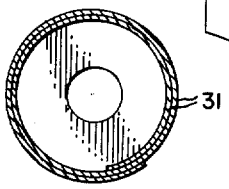
Figure 7:
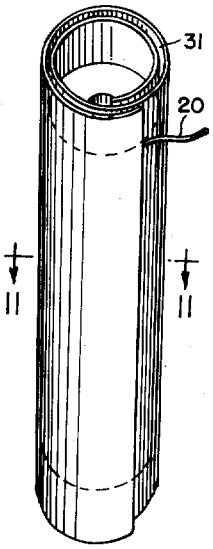
Figure 8:
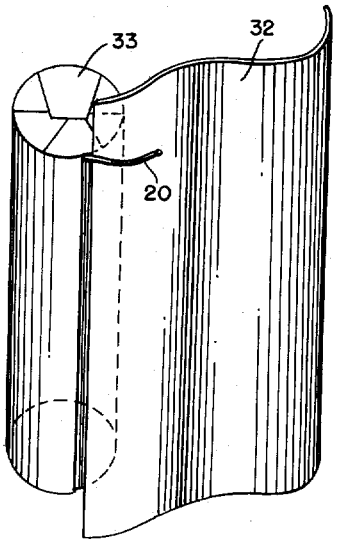
Figure 9:
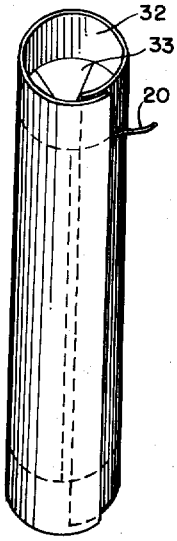
Figure 10:
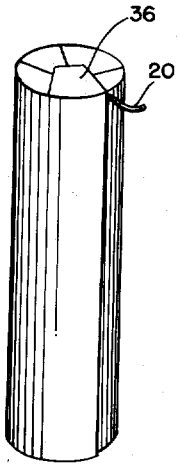
Figure 12:
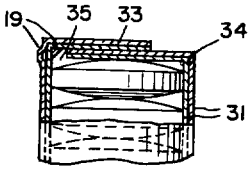

FIGS. 6, 7, 8, 9, and 10 illustrate a modification of the invention and the successive steps performed during the formation of the package;

FIG. 11 is an enlarged transverse sectional view taken substantially along line 11—11 of FIG. 7; and FIG. 12 is an enlarged fragmentary sectional view of the package, with a portion broken away to show the positioning of the opening thread in the completed package.

Referring particularly to FIGS. 1 through 5, a plurality of articles 10 positioned in end-to-end relationship define a stack 11 which is adapted to be encased in a sheet of flexible wrapping paper 12. This sheet is substantially rectangular in shape and includes opposite parallel end edges 13 and 14, and top and bottom edges 15 and 16, respectively. Further, the sheet of wrapping paper 12 is made of the material "Rayseal" which includes an outer layer of aluminum foil 17 and an inner layer of waxen paper 18, these layers being bonded to one another to define the composite sheet 12.

A flexible opening element 19, which may be defined as a strand or filament of thread is positioned in spaced relationship to the top edge 15 and parallel thereto with one end terminating at the end edge 14 and the other end protruding beyond the other end edge 13 to define a free end 20. This thread 19 is suitably fastened to the inner face of the wrapping sheet 12 by a suitable thermoplastic 21, such as wax.

The stack of articles 11 is of such height as to position the uppermost article 10 just below the opening element 19 and the lowermost article 10 in spaced relationship above the bottom edge 16 such as along the dotted line indicated at 22. The axis of the stack of articles 11 will be normal to the top and bottom edges 15 and 16. Then the sheet 12 is peripherally arranged around the stack of articles 11 so that the end edge 13 and a portion of the sheet adjacent thereto overlaps the end edge 14 and a portion of the sheet adjacent thereto, wherein the package takes the form as shown in FIG. 2 having opposite open ends 23 and 24. The portion of the sheet 12 adjacent the opposite edge 13 will be heat-sealed to the portion of the sheet adjacent the edge 14 to prevent the passage of air therebetween.

In further closing the package, the opposite open ends 23 and 24 are folded over in the conventional manner to define at each end a plurality of overlying folds, as seen in FIG. 3, thereby defining folded end portions 25. The opposite folded ends 25 are heat-sealed in order to hold the folds in position and prevent the entrance of air into the package. In order to properly heat-seal the folded ends, it is necessary to perforate the foil layer so the wax can melt through and provide a seal between foil to foil surfaces. Alternatively, melting wax may be added to the foil side of the wrapper to effect this seal.

As seen most clearly in FIG. 5, a folded end 25 defines, with the side walls of the package, an annular crease 26. The articles are flat along their side edges as indicated at 27, and then bulge upwardly and downwardly as indicated at 28 in relative pillow fashion, the end article defining with the folded end 25 of the package an annular chamber 29. It is then seen that the opening thread 19 is positioned within this chamber and at the crease 26.

After the heat-sealing operation on the folded ends of the package, an outer band 30 is applied about the peripheral surface of the wrapper for purposes of labeling the contents of the package.

As shown in FIGS. 2 and 3, the free end 20 of the opening thread 19 protrudes beyond the overlapping edge 13, and when this free end is pulled, the entire folded end portion 25 is torn from the package as shown in FIG. 4. In other words, a line of tear at the crease 26 will be effected by pulling the free end of the opening thread, thereby opening one end of the package and permitting the removal of the articles 10 therefrom.

Referring now to FIGS. 6 through 10, inclusive, substantially the same arrangement is disclosed except that the wrapper consists of an inner sheet of waxen paper 31 and a separate outer sheet of foil 32. In other words, instead of employing a single laminated sheet, as shown in FIGS. 1 to 5, two separate wrapping sheets may be used. Otherwise, this package is formed in a manner similar to that already set forth in connection with the embodiment of FIGS. 1 to 5, wherein the opening thread 19 is secured to the inner waxen sheet 31 and the wrapping sheets 31 and 32 are peripherally arranged about the stack of articles 11 with the opposite ends being folded in, as indicated at 33. However, in this embodiment, it will be noted that the wax wrapping sheet 31 is first arranged twice around the stack of articles, FIG. 7, and then the foil wrapping sheet 32 is peripherally arranged once about the wrapped sheet 31, FIGS. 8 and 9. Note in FIG. 8 that the foil sheet is positioned a slight distance from the edge of the wax sheet when it is started to be wrapped about the package. By pulling the free end 20 of the opening thread, the adjacent folded end portions 33, 36 will be torn from the package allowing access thereinto.

As seen most clearly in FIG. 12, the folded end 33 defines, with the side walls of the package, an annular crease 34. The articles are like those shown in FIG. 5 and likewise define an annular chamber 35 with the folded end 33. It is seen that the opening thread 19 is positioned substantially in the crease 34 along the inner side of the wrapping sheet 31 and secured thereto by a suitable thermoplastic.

It will be understood that modifications and variations may be effected without departing from the scope of the novel concepts of the present invention, but it is understood that this application is to be limited only by the scope of the appended claims.

The invention is claimed as follows:

1. A package comprising a sheet of wrapping material wrapped around a stack of cylindrical articles, the opposite ends of the material being folded tightly against the opposite ends of the stack thereby defining annular creases extending through parallel planes normal to the longitudinal axis of the package, an opening thread arranged at one end of the package along the inner side of said wrapping material adjacent one of the folded ends and substantially in alignment with the annular crease at said end, said thread being secured to the wrapping material, said opening thread being arranged substantially in the said plane of the crease, one end of said opening thread protruding laterally from the package, and said opening thread serving as an opening element for the package, whereby pulling of said one end of the thread effects a tearing of the wrapper along the line of securement thereby removing the corresponding folded end for access into the package.

2. The package as defined in claim 1, wherein the sheet of wrapping material is wrapped once around the stack of cylindrical articles.

3. The package as defined in claim 1, wherein the sheet of wrapping material is wrapped at least twice around the stack of cylindrical articles.

*4. A package comprising a sheet of wrapping material wrapped around an article of substantially uniformly dimension, the opposite ends of the material being folded tightly against the opposite ends of the article and defining peripheral creases lying in parallel planes normal to the longitudinal axis of the package, an opening thread arranged at one end of the package along the inner side of said wrapping material adjacent one of the folded ends and substantially coinciding with the peripheral crease at said end, said thread being secured to the wrapping material, said opening thread being arranged substantially in the said plane of the crease, one end of said opening thread protruding laterally from the package, and said opening thread serving as an opening element for the package, whereby pulling of said one end of the thread effects a tearing of the wrapper along the line of securement thereby removing the corresponding folded end for access into the package.*

References Cited in the file of this patent or the original patent.

UNITED STATES PATENTS

| | | |
|---|---|---|
| 23,230 | Colt | Mar. 15, 1859 |
| 1,220,208 | Ellis | Mar. 27, 1917 |
| 2,019,191 | Milmoe | Oct. 29, 1935 |
| 2,031,886 | Heifetz | Feb. 25, 1936 |
| 2,079,328 | McBean | May 4, 1937 |
| 2,166,171 | McBean | July 18, 1939 |
| 2,284,668 | Martin | July 2, 1942 |
| 2,695,847 | Fisher | Nov. 30, 1954 |
| 2,775,395 | Bergstrom | Dec. 25, 1956 |